United States Patent [19]

Garrett

[11] 3,924,079

[45] Dec. 2, 1975

[54] LATCHING MULTIPLEXER CIRCUIT

[75] Inventor: Lane S. Garrett, Scottsdale, Ariz.

[73] Assignee: Motorola, Inc., Chicago, Ill.

[22] Filed: Jan. 2, 1974

[21] Appl. No.: 429,965

[52] U.S. Cl. .......................... 179/15 A; 179/15 AQ

[51] Int. Cl.[2] .......................................... H04J 3/00

[58] Field of Search ........... 179/15 A, 18 GF, 18 G, 179/18 H, 15 AQ, 15 BA, 15 AT; 307/38, 40, 80, 241–243, 247 R; 340/147 C, 147 CN, 147 CU, 147 T; 328/104, 154

[56] References Cited

UNITED STATES PATENTS

| | | | |
|---|---|---|---|
| 3,614,327 | 10/1971 | Low | 307/243 X |
| 3,644,679 | 2/1972 | Tallegas | 179/15 AQ |
| 3,692,942 | 9/1972 | Inose | 179/15 A X |
| 3,790,715 | 2/1974 | Inose | 179/15 A X |

*Primary Examiner*—William C. Cooper
*Assistant Examiner*—E. S. Kemeny
*Attorney, Agent, or Firm*—Harry M. Weiss; Kenneth R. Stevens

[57] ABSTRACT

An eight by eight multiplex system is disclosed which is capable of independently switching any one of eight inputs to any one of eight outputs at will. This is accomplished through eight multiplex decoding gate matrices under the control of an address memory individually associated with each matrix to couple the output of that matrix with the desired one of the input leads. The address memories may be continuously synchronously updated with address information; they may be set once when the system is initially put into operation; or they may be changed at any random intervals depending upon the use to which the multiplex system is placed. Disclosure is made of both linear and digital versions, and the linear version is capable of two-way interchange of information between the input and output terminals.

8 Claims, 4 Drawing Figures

LATCHING MULTIPLEXER CIRCUIT

BACKGROUND OF THE INVENTION

Multiplex systems for time division multiplex or space division multiplex used to couple different input lines to selected output lines in accordance with a predetermined time sequence or a pre-established space condition exist for a large number of specialized systems. In time division multiplex systems, a number of incoming lines share a single outgoing or transmission line on a time division basis. Telephone switching systems also exist which permit a calling party to be connected by way of a number of different paths to a selected called party. In the telephone art, this generally is done by a cross-point switch or its equivalent in a highly specialized switching or multiplexing system.

Electronic monitoring of industrial functions also is becoming widely used. For industrial applications multiplex systems which are capable of interconnecting desired ones of different data input lines to selected different data output lines are required. Once again, the common practice is to design a special multiplexing system for each individual industrial application.

A need exists for a building block multiplex system which is capable of use in a wide variety of applications ranging from time division multiplex systems to industrial analog monitoring applications. There also is a need for a wide flexibility of operating options for such a system, such as a synchronous or asynchronous operation with readily changeable interconnections between input and output lines. Ideally, a universal multiplexing system should be capable of fabrication in a monolithic integrated circuit form, preferably using standard packages already available for other purposes.

SUMMARY OF THE INVENTION

It is an object of this invention to provide an improved multiplex system.

It is a further object of this invention to provide a programmable multiplex system capable of a wide variety of uses.

It is another object of this invention to provide a multiplex system which is capable of asynchronous or synchronous operation with respect to programming address input signals.

It is yet another object of this invention to provide a multiplex building block which can be used in parallel with other similar building blocks with common bus inputs or common bus outputs.

It is an additional object of this invention to provide a multiplex system which can be fabricated in monolithic integrated circuit form.

In accordance with a preferred embodiment of this invention, a multiplex system is disclosed for transferring data appearing on any one of N input terminals to any one of M output terminals, where N and M are positive integers. The system includes M decoding gate matrices, each having one output and each having N inputs which are coupled to the N input terminals, respectively. Each of the decoding gate matrices also is controlled by an associated address input memory circuit which provides a binary address output coupled to the decoding gate matrix to complete an interconnection between a selected one of the N inputs and its output. The address input memory circuits are comprised of binary latching switches and have addressing input signals applied to all of the address input memory circuits in parallel. These address input signals are entered into the appropriate address memory circuits by a strobe or enabling signal which is obtained from an eight-state ring-type counter circuit.

In one embodiment, the decoding gate matrix is comprised of transmission gates which interconnect the individual inputs with the common output and which are capable of passing information in either direction. In another embodiment, the decoding gate matrix is a digital system including digital logic gates which couple the selected input data to the particular output line for that matrix.

DETAILED DESCRIPTION

Figure 1:
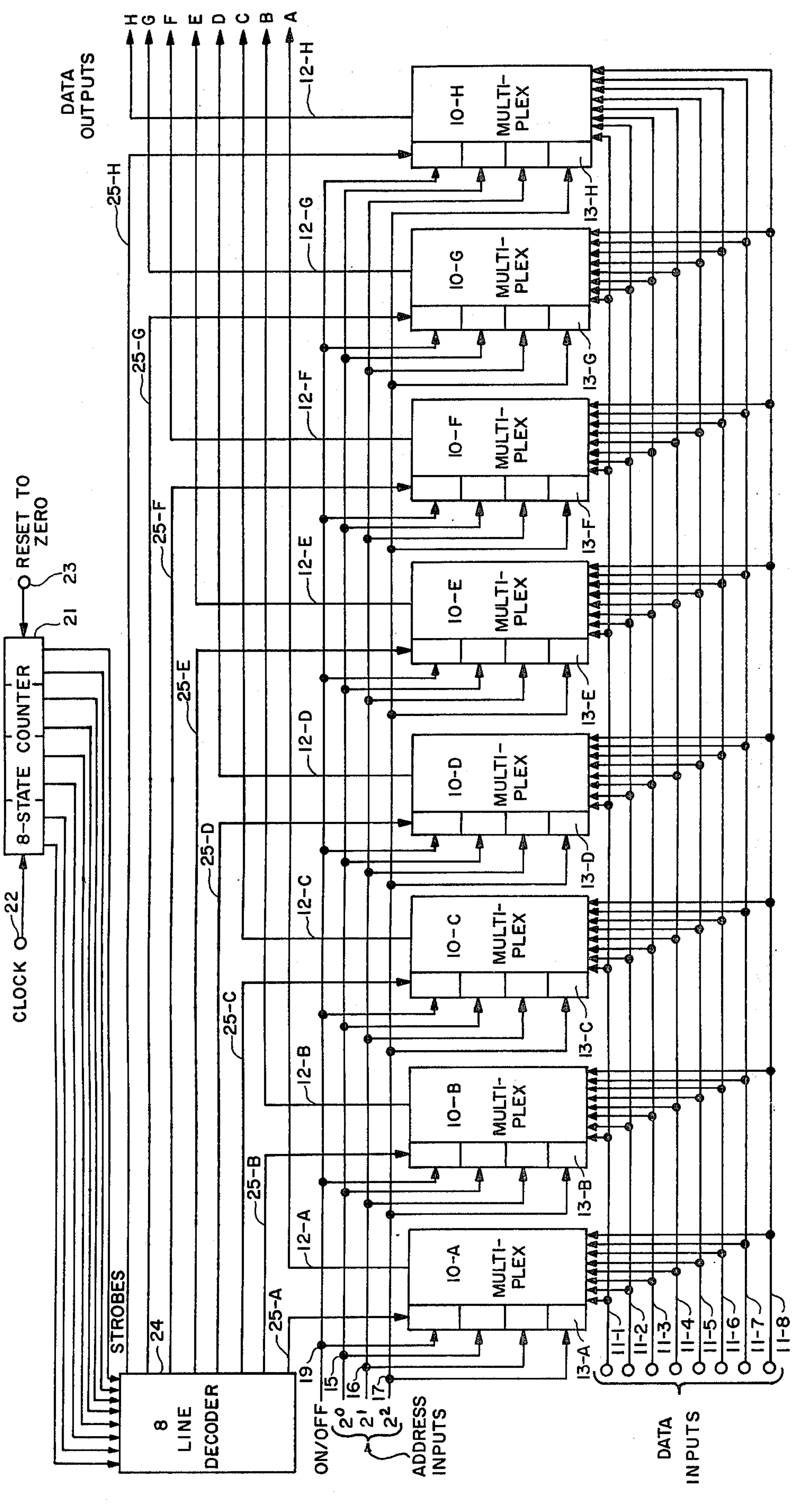
FIG. 1 is a block diagram of the multiplex system according to a preferred embodiment of this invention.

In the drawings, the same reference numbers are used throughout the several figures to designate the same or similar components.

Referring now to FIG. 1, there is shown an eight by eight multiplex system which operates to connect any one of eight data input lines or terminals to any one of eight data output lines or terminals under the control of external addresses. An array of eight multiplex decoding matrices 10-A through 10-H each are supplied with data input signals on eight different inputs connected respectively to eight different data input lines or busses 11-1 to 11-8, connected in parallel to the respective inputs of each of the multiplex decoding gate matrices 10-A to 10-H.

Each of the decoding gate matrices 10-A to 10-H is capable of interconnecting any one of the data input leads 11-1 to 11-8 with its respective data output lead 12-A to 12-H. There is no restriction in the system concerning which of the different data input leads 11-1 to 11-8 is interconnected with any of the data output leads 12-A to 12-H. Any one of the decoding gate matrix circuits 10-A to 10-H is capable of independently interconnecting its corresponding output with any one of the data inputs.

To effect the interconnection of a selected data input lead with the output lead for each of the decoding gate matrices 10-A to 10-H, a different address memory circuit 13-A to 13-H is connected to each of the decoding gate matrices 10-A to 10-H. As illustrated in FIG. 1, each of these address memory circuits is indicated as a four-stage device. The lower three stages are supplied with binary weighted address inputs on three address input leads 15, 16 and 17. The address information on these leads represents any one of eight possible different binary numbers.

An additional input lead 19 is also provided with two level or binary information and operates as an on/off control for the eight decoding gate matrix circuits 10-A to 10-H. The on/off lead 19 is shown as connected to the upper one of the four boxes in the address input memory circuits 13-A to 13-H and operates independently of the information on the address input leads 15, 16 and 17.

To provide the greatest flexibility in the operation of this system, it is desirable to be able to change the address information individually for any one of the decoding gate matrices 10-A to 10-H either at random or in a pre-established sequence. This flexibility is realized by utilizing binary latching switches for each of the four stages of the address memory circuits 13-A to 13-H. These latching switches are strobed or enabled under the control of a clock signal appearing in either asynchronous or synchronous operation with the information on the address inputs 15, 16 and 17 and the information appearing on the data inputs 11-1 to 11-8.

A ring-type counter circuit is illustrated in FIG. 1 as an eight-state counter 21 which is applied with clock pulses from a suitable source (not shown) on an input terminal 22. The eight-state counter 21 is illustrated as a four stage counter which can be reset to zero by the application of a reset pulse on an input terminal 33. This insures that the counter always can be started at the same known count. Each of the four stages of the counter 21 provides two outputs of opposite phase, that is when one is high the other is low and vice versa. These outputs are connected to an eight line decoder circuit 24 which produces enabling pulses or strobe pulses on eight output leads 25-A to 25-H. Only one of these leads has an output pulse on it any one time, and the selection of the particular lead which has this output pulse is established by the state of the eight state counter 21.

The address memory circuits 13-A to 13-H continuously store the previous address to which they were set irrespective of any changes in the address inputs on the leads 15, 16 and 17 so long as no enabling or strobe pulse appears on the corresponding lead 25-A to 25-H connected to the address memory circuit. At any time, however, that a strobe or enabling pulse appears on the lead 25 for an address memory circuit 13, the address input then appearing on the leads 15, 16 and 17 is stored into and remains in the address input memory circuit 13 until the next occurrence of an enabling or strobe pulse. The stored address is supplied to the corresponding decoding gate matrix 10 to interconnect one of the input leads 11-1 to 11-8, as determined by the address, to the output 12 of that decoding gate matrix.

The renewal or changing of the addresses in the address input memory circuits 13-A to 13-H can be on a regular cyclical basis, synchronized with information applied to the data input leads 11-1 to 11-8, or it can be done asynchronously. It may be desired to monitor slowly changing information on the data input leads 11-1 to 11-8 by applying it at a random sequence to different ones of the output leads. For this type of operation, the address input on the leads 15, 16 and 17 can be changed whenever the output information is desired. The operation of the clock which supplies the input clock pulses to the terminal 22, may be coordinated with the changes of addresses on the input 15, 16 and 17 to cause the multiplex decoding gate matrix circuits to interconnect the proper input and output leads at the desired times.

Because the system which is shown in FIG. 1 is capable of operation in such widely different modes, no timing diagram has been shown since no single timing diagram is representative of the various ways in which the circuit can be utilized. The circuit of FIG. 1 is a basic building block eight by eight multiplex circuit which is capable of utilization in a wide variety of applications dependent upon the information to be transferred between the input and output leads or terminals, the frequency at which the address inputs are changed, the relative frequency of the clock signal pulses on terminal 22, and the type of information appearing on the data input leads 11-1 to 11-8.

Figure 2:
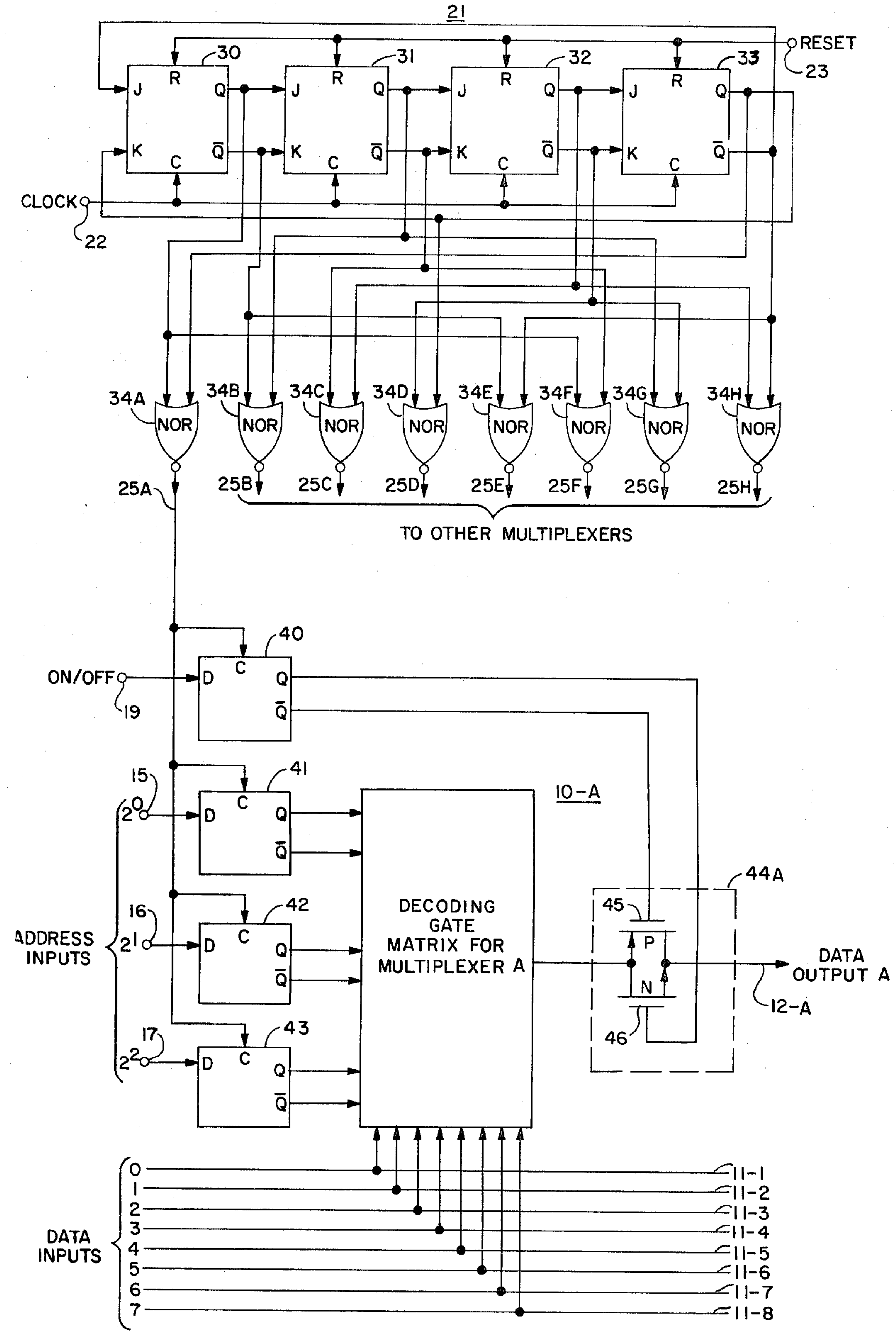
FIG. 2 is a circuit diagram showing portions of the circuit of FIG. 1 in greater detail.

In FIG. 2 the eight-state counter 21, the line decoder 24, and the address input memory circuit 13 are shown in greater detail.

The eight-state counter 21 could assume a number of different configurations. For example, it could be a simple eight stage ring counter. If this type of counter circuit were used, there would be no need for the additional eight line decoder 24, since the counter itself would provide the eight individual outputs 25-A to 25-H which are used in the circuit of FIG. 1. Another configuration could be a three stage binary counter. This would require the eight line decoder circuit 24 to include some three input coincidence gates. The counter circuit which is shown in FIG. 2 is a four stage counter, each stage of which is in the form of a conventional J-K flip-flop circuit. The two outputs of each of the J-K flip-flop circuits 30, 31, 32 are connected directly to the corresponding inputs for the next succeeding flip-flop to cause the state of the preceding flip-flop to be transferred directly to the next succeeding flip-flop upon the application of a clock pulse on the lead 22. The two outputs of the final flip-flop 33 of the counter, however, are cross-coupled to the inputs of the first flip-flop 30 to cause the information transfer from the last flip-flop 33 back to the first flip-flop 30 to always reverse state. That is, if the last flip-flop 33 is set to its 1 binary state, the next succeeding clock pulse then sets the flip-flop 30 to its 0 binary state. Initially, all four stages 30 to 33 of the counter 21 are reset to their zero stage, which results in the four flip-flops 30 to 33 continuously cycling through eight different combinations of states in accordance with the following truth table:

| | 30 | 31 | 32 | 33 |
|---|---|---|---|---|
| 1 | 0 | 0 | 0 | 0 |
| 2 | 1 | 0 | 0 | 0 |
| 3 | 1 | 1 | 0 | 0 |
| 4 | 1 | 1 | 1 | 0 |
| 5 | 1 | 1 | 1 | 1 |
| 6 | 0 | 1 | 1 | 1 |
| 7 | 0 | 0 | 1 | 1 |
| 8 | 0 | 0 | 0 | 1 |

An examination of this truth table shows that it is possible to obtain outputs representative of each of these eight different conditions of the counter 21 by selecting eight different combinations of two outputs from the four stages of the counter. For example, for only one of the eight conditions are both the flip-flops 30 and 33 in their 0 state. This means that only once in each cycle of eight clock pulses on the lead 22 does this condition exist, so that the $\overline{Q}$ outputs of the flip-flops 30 and 32, or conversely the Q outputs of these two flip-flops, can be applied to a coincidence gate to produce an output whenever this state of the counter occurs. Similar combinations of two outputs which exist only once in each cycle of eight input pulses are present for each of the other conditions shown in the truth table.

Thus, the eight different strobe or enabling pulses can be obtained from eight NOR gates 34-A to 34-H, each having two inputs connected to respective outputs of the flip-flop circuits 30 to 33 as shown in FIG. 2.

The reason that this configuration of the counter 21 and gating circuit 24 was selected over the others mentioned is that when the circuit is fabricated in metal oxide silicon field-effect transistor (MOSFET) technology, the configuration shown in FIG. 2 can be implemented in less chip area than either of the other two types of counter configurations. If this savings in area is not necessary or is not desired, other types of counters and gating arrangements can be used.

Since each of the right stages of the multiplex circuit shown in FIG. 1 are the same, only one of these stages, stage A, is shown in FIG. 2. It should be understood that the following description directed to stage A, including the decoding gate matrix 10-A and the address memory circuit 13-A, is equally applicable to the other seven stages of the circuit which are shown in FIG. 1.

The address memory circuit 13-A comprises four conventional bistable latching switches 40, 41, 42 and 43. Three of these bistable latching switches 41 to 43 are arranged as a three-stage binary address register and are provided respectively with the address input signals on the three parallel address input leads 15, 16 and 17. The operation of the bistable latching circuits 40 to 43 is such that they remain set to one or the other of their two stable states until the application of an address input indicative of the opposite stable state is applied to their address input terminals simultaneously with the occurrence of an enabling pulse on the strobe lead 25-A. Until this occurs, there is no change in state of the bistable latching switches 40 to 43.

If it is desirable to prevent any coupling of a data input terminal to a data output terminal for the decoding gate matrix circuit 10-A during the time that an address input is being changed, the bistable latching switch 40 may be set first to its "off" condition (often this is not required due to the high switching speeds of MOS compared to data rates normally encountered). Usually, this switch is in its "on" condition where the Q output is high and the $\bar{Q}$ output is low. These outputs are applied to the two control inputs of a conventional CMOS transmission gate 44-A which is formed as an integral part of the decoding gate matrix circuit 10-A. The transmission gate 44-A includes a P-channel FET transistor 45 connected in parallel with an N-channel transistor 46. For the "on" output condition of the bistable latching switch 40, both transistors 45 and 46 are conductive. In this state of operation, the transmission gate 44-A passes data or signal information equally well in either direction.

Now assume that the input on the lead 19 goes from a high condition, indicative of "on" to a low condition indicative of "off." At the same time, assume that an address input indicative of a change of address is applied to the three terminals 15, 16 and 17. When the next strobe or enable pulse appears on the lead 25-A, each of the bistable latching switches 40 to 43 is set to the binary state of the signal appearing on its respective input lead 19, 15, 16 and 17. Thus, the output of the on/off bistable latching switch 40 reverses from that which was described previously. The transmission gate 44 then is made non-conductive and blocks the passage of signals in either direction.

At the same time, a new address is set up in the address memory circuit 13-A. This causes the decoding gate matrix 10-A to interconnect a new one of the data input leads 11-1 to 11-8 with the input to the transmission gate 44-A.

The signal on the lead 19 then is permitted to once again go high just prior to the time that a new cycle of operation of the counter occurs to produce an output pulse on the lead 25-A. Before this pulse appears, the address input on leads 15, 16 and 17 also once again must be made the same as it was when the address was set into the bistable latching switches 41 to 43 to be sure that no change in the state of these switches takes place on the occurrence of the enabling pulse on the lead 25-A which turns "on" the switch 40 to open the transmission gate 44-A. If, for any reason, a stage of the multiplex system is to be disabled, the input on the lead 19 should represent "off" each time an enabling pulse appears on the lead 25 for that stage. Once all of the stages of the multiplex system have been programmed with the desired address, the operation of the counter circuit 21 may be terminated by ceasing to apply clock pulses to the lead 22. So long as no clock pulses occur and so long as no new address inputs are provided, the system operates much as a series of fixed switches interconnecting the various data input leads 11-1 to 11-8 with the data output leads 12-A to 12-H in accordance with the addressing of the decoding gate matrices 10-A to 10-H.

Figure 3:
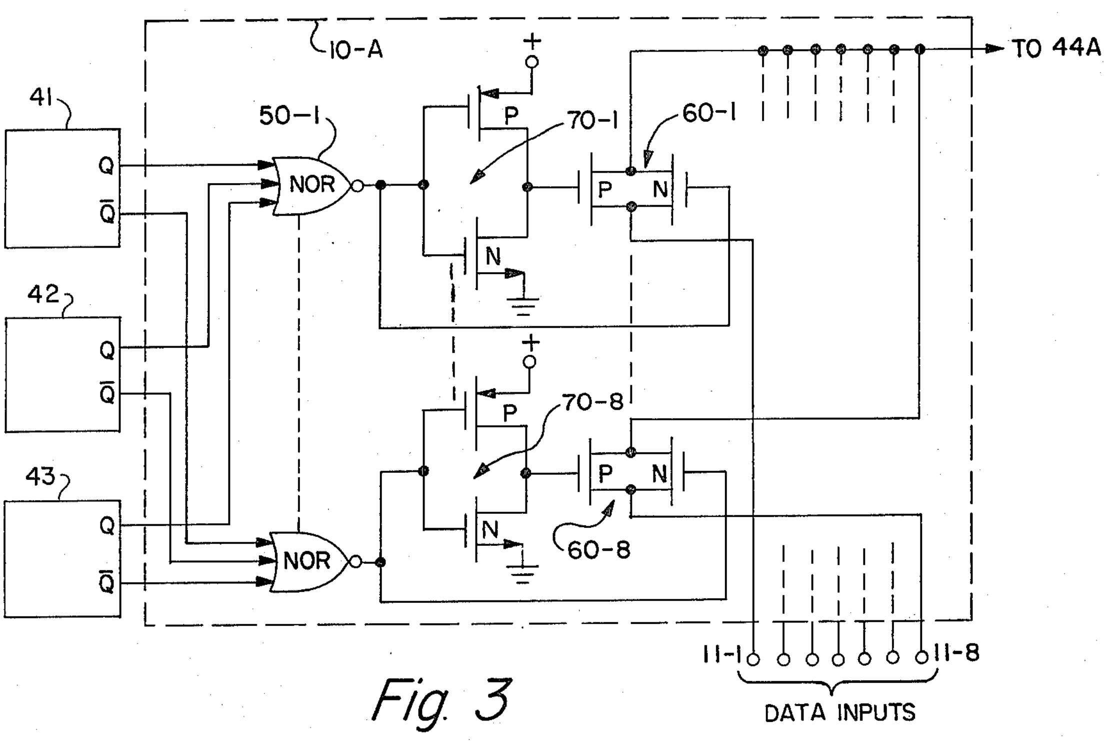
FIGS. 3 and 4 are circuit diagrams showing a portion of the circuit of FIG. 2 in greater detail.

In FIG. 3, there is illustrated a version of the decoding gate matrix 10-A for transferring linear information in either direction between selected ones of the eight data input leads and the output lead coupled to the input of the transmission gate 44-A. The eight different binary numbers which the three bistable latching switches 41, 42 and 43 are capable of representing are decoded by eight different three-input NOR gates 50-1 to 50-8. The manner in which this decoding takes place is well known, and only two of these NOR gates, 50-1 and 50-8 are shown in FIG. 3 to avoid cluttering the drawing. The output of each of the NOR gates 50-1 to 50-8 is applied to a corresponding transmission gate 60-1 to 60-8. These transmission gates are of the same type as the transmission gate 44-A which has been described.

Since each of the NOR gates 50-1 to 50-8 only produces a single output, it is necessary to invert this output with a corresponding standard CMOS inverter circuit 70-1 to 70-8 for application to the gate of the P-channel transistor in the corresponding transmission gate 60-1 to 60-8. The outputs of the NOR gates 50-1 to 50-8 are applied directly to the gates of the N-channel transistors of the transmission gates 60-1 to 60-8. Only one of the NOR gates 50-1 to 50-8 has a high output indicative of the selected address at any one time. For example, the output of the NOR gate 50-1 is high when the binary state of the three bistable latching switches 41, 42 and 43 is 0 for each of the switches (Q outputs high, Q outputs low). Similarly, the NOR gate 50-8 produces a high output only when the binary state of the three switches 41, 42 and 43 is 1 for each of the three switches (Q outputs high, $\bar{Q}$ outputs low).

The transmission gates 44-A and 60-1 to 60-8 are capable of transmission of information in either direction; so that when the selected transmission gates are rendered conductive, information can freely pass in either direction from the selected data input terminal to the output terminal 12-A at the output of the transmission gate 44-A or vice versa.

Figure 4:
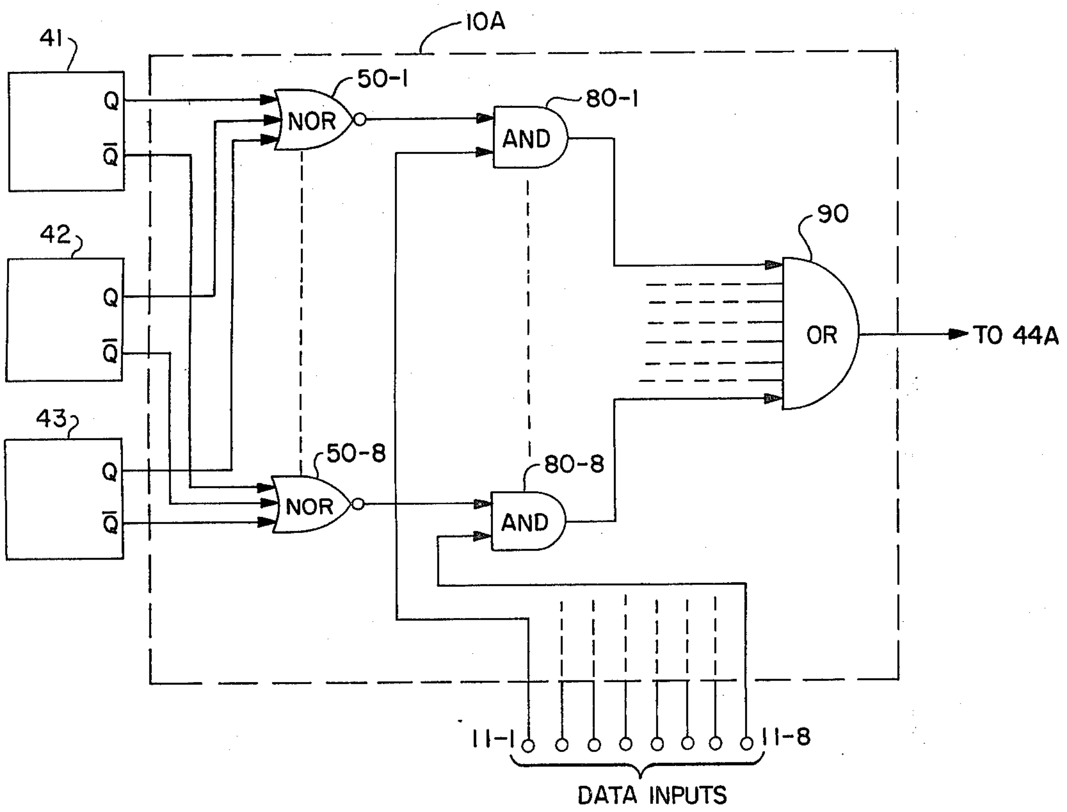

FIG. 4 shows a version of the decoding gate matrix 10-A which is suitable for the transfer of digital information appearing on the data inputs to the data output terminal 12-A. The decoding of the address from the address switches 41, 42 and 43 is done through NOR gates 50-1 to 50-8 in the same manner as shown in FIG. 3. Instead of transmission gates, however, the outputs of these NOR gates are connected respectively to one input of eight two input AND gates 80-1 to 80-8. The second input to each of the AND gates 80-1 to 80-8 is connected to the respective one of the data input leads 11-1 to 11-8. The outputs of all of the AND gates 80-1 to 80-8 are connected to the input of an OR gate 90, the output of which in turn is connected to the input of the transmission gate 44-A. Digital information appearing on the selected data input lead is connected through the selected AND gate 80, the OR gate 90, and the transmission gate 44-A to the output terminal 12-A. The circuit shown in FIG. 4, however, unlike the circuit FIG. 3, is capable of passing information in only one direction, that is from the selected data input lead to the data output lead 12-A.

The above description has been directed to an eight by eight programmable multiplexing circuit, but it should be apparent that the particular number of multiplexing stages which have been selected is not limiting. Either more or fewer stages can be used for a given system. The eight by eight matrix array, however, is a practical building block size for a system of this type and can be implemented in present CMOS (complementary metal oxide field-effect transistor) technology and packaged in a standard 24 pin package.

The addressing scheme which has been described also allows the multiplexing array to have a minimum number of interconnects and permits simplified wiring and resultant greater reliability. The clock for driving the counter and the address inputs can be renewed from a computer control system or these inputs can be manually established in initially setting up the system for utilization as part of a circuit where the multiplex interconnects would not be changed after they were initially established.

Because of the static nature of the design which is used, the clock may be synchronous or asynchronous in nature. The only requirement is that the signals on the address inputs should be coordinated with the states of the outputs of the counter so that the desired interconnections between the data input leads 11-1 to 11-8 are effected with the data output leads 12-A to 12-H. The reset input to the counter is provided to start the counter from a known state.

The decoding gate matrices of the system can be used in pairs for two-wire telephone interconnections. Other options permit the physical wiring together of any two or more of the outputs 12-A to 12-H through use of an "on-off" 3-state control to effectively "OR" the data appearing on the inputs. The input leads 11-1 to 11-8 also can be bussed to one or more additional multiplex arrays to increase the distribution possibilities for the signals appearing on those input leads. A number of multiplex systems of the type shown in FIG. 1 can be stacked in this manner. Similarly, the outputs of a stacked series of multiplex systems can be connected in common or "bussed" to permit interconnection of each output with a larger number of inputs. The system is designed with a high degree of flexibility for utilization in a large number of different applications.

I claim:

1. A system for selectively transferring data appearing on any one of N input terminals to any one of M output terminals, where N and M are positive integers, including in combination:

M decoding gate means each having an output coupled to one of said M output terminals and having N inputs coupled to said N input terminals, respectively;

M address memory means, each comprising a binary register having a predetermined number of output terminals capable of producing at least N different binary number output combinations, the output terminals of each of said address memory means coupled to a different one of said M decoding gate means for causing such decoding gate to interconnect a predetermined one of said N inputs thereof with the output thereof in accordance with the binary number appearing on the output terminals of said address memory means;

means for supplying a binary address input in common to all of said M address memory means;

ring counter circuit means having at least M output terminals each coupled with a different respective one of said M address memory means for enabling said address memory means sequentially to store in said binary register of each of said address memory means the binary address input supplied thereto only when said binary registers are enabled by an output from said ring counter circuit means.

2. The combination according to claim 1 wherein each of said decoding gate means passes information from the interconnected one of said inputs to said output thereof and from said output to said interconnected input.

3. The combination according to claim 1 wherein each of said binary registers comprises a plurality of binary latching switches having first and second stable states of operation and settable by an enabling signal from said ring counter means coinciding with binary address inputs representative of either of said first or second stable states.

4. The combination according to claim 3 wherein each of said decoding gate means comprises M digital logic gate circuits each coupled with a different one of said N inputs and each enabled by a different one the N binary number output combinations from said binary register coupled thereto so that only one of said digital logic gate circuits is enabled to pass signals from the data input with which it is connected to its output; and OR gate means coupled to the outputs of all of said digital logic gate circuits, with the output of said OR gate means comprising the output of said decoding gate means.

5. The combination according to claim 1 further including M transmission gates, each coupling the output of a corresponding decoding gate means with a different one of said M output terminals.

6. The combination according to claim 5 further including means for controlling the conductivity of said transmission gate means.

7. The combination in accordance to claim 1 wherein each of said address memory means comprises at least one bistable latching circuit settable to one or the other of two stable states in accordance with the simultaneous occurrence of a corresponding address input signal and enabling signal from said counter means.

8. The combination according to claim 7 wherein each of said address memory means, includes a plurality of bistable latching circuits arranged to represent binary weighted digits, with the outputs thereof representing at least N different stored address inputs.

* * * * *